United States Patent [19]

Rieben

[11] 4,284,254
[45] Aug. 18, 1981

[54] LOW PROFILE PRECISION ACTUATOR

[75] Inventor: Ralph E. Rieben, Altamont, Tenn.

[73] Assignee: The United States of America as represented by the Secretary of the Air Force, Washington, D.C.

[21] Appl. No.: 121,076

[22] Filed: Feb. 13, 1980

[51] Int. Cl.³ .................. B64C 13/24; B64C 13/28
[52] U.S. Cl. .................. 244/75 R; 73/147; 74/520; 74/521; 244/90 R; 244/213
[58] Field of Search .............. 244/213, 203, 214, 210, 244/215, 90 R, 75 R; 74/469, 520, 521; 73/147

[56] References Cited

U.S. PATENT DOCUMENTS

| 2,448,712 | 9/1948 | Hampshire | 244/90 R |
| 2,861,758 | 11/1958 | Howard | 244/90 R |
| 2,973,925 | 3/1961 | Wiele | 244/210 |
| 3,689,018 | 9/1972 | Pelle et al. | 74/520 |
| 3,894,618 | 7/1975 | Enright | 188/72.2 |

Primary Examiner—Galen L. Barefoot
Attorney, Agent, or Firm—Donald J. Singer; Arsen Tashjian

[57] ABSTRACT

A precision actuator of minimum thickness which provides high output force with low input torque and includes a single-piece metallic rhombus with a drive assembly made up of a right-hand threaded rod that passes through a right-hand threaded side apex of the rhombus connected by a coupling to a left-hand threaded rod that passes through a left-hand threaded side apex opposite the other threaded apex of the rhombus. The right-hand threaded and left-hand threaded rods are secured to the coupling such that the drive assembly rotates as a unit. Right-hand rotation of the drive assembly increases the distance between the threaded apexes while drawing the end apexes closer together and left-hand rotation of the drive assembly draws the threaded apexes closer together forcing the end apexes further apart.

4 Claims, 4 Drawing Figures

LOW PROFILE PRECISION ACTUATOR

STATEMENT OF GOVERNMENT INTEREST

The invention described herein may be manufactured and used by or for the Government for governmental purposes without the payment of any royalty thereon.

BACKGROUND OF THE INVENTION

This invention relates to a precision actuator for generating precise motion in a confined area and, more particularly, the invention is concerned with providing a low profile precision actuator suitable for use as an aileron control system for a one-twentieth scale model high performance aircraft in a wind tunnel maneuverability test and design program.

There are many situations which require precise movement in confined spaces. Confined spaces may be defined as a volume which has severe restrictions in one dimension of a volume while the other two dimensions are relatively free from restrictions. Simple dial pointer movements and complicated control actuators are examples where precise motion in a confined space is required.

In an attempt to accomplish precise movement within confined space limits using conventional methods, the results have been inexact and non-repeatable due to the inherent tolerances associated with the joint fits which attach the actuating members together. For example, the ability to "fly" an aircraft model through realistically simulated maneuvers in a wind tunnel requires that motion measurements be produced that agree well with measurements from the real aircraft in flight so that this capability can be applied in the design, development or refinement phases of an aircraft program. It permits the effect of any design changes to be examined quickly at critical points in the maneuvering flight envelope. Several components are integrated into a computer-controlled closed loop which allows banks, turns and stalls in an almost totally "hands-off" operation.

In a one-twentieth scale model of a high performance aircraft which was used in a test run, new wing and tail control surfaces were designed and fabricated for movement similar to that on the actual aircraft. This required the delicate machining of an aileron control system suitable for installation within the quarter-inch thickness of the model wing. The hereinafter disclosed low-profile precision actuator includes delicate parts which were machined from a stainless steel-molybdenum alloy in order to withstand relatively high aerodynamic forces. The aileron control system according to the invention permits the positioning of the aileron at the required angles to duplicate those experienced by aircraft in maneuvering flight.

SUMMARY OF THE INVENTION

The present invention is concerned with providing a low profile precision actuator for installation within the wing of a scale model high performance aircraft. The actuator provides high output force with low input torque and an extremely high degree of precision movement in a confined space. The device includes a rhombus having an apex at one end attached to a fixed portion of the model with its opposite apex at the other end being attached to a moveable hinged aileron. The two side apexes of the rhombus are threaded, one having a right-hand thread and the other having a left-hand thread. Movement is accomplished by passing a threaded rod through each of the threaded side apexes of the rhombus and joining the inner ends of the rods with a coupling so that both rods and coupling rotate as a unit. The rotation of the unit causes the side apexes to either separate or move closer together producing a corresponding substantially linear movement in the end apex which is attached to the moveable hinged aileron.

Accordingly, it is an object of the invention to provide a low profile precision actuator suitable for installation in a scale model high performance aircraft to operate the control surfaces during wind tunnel design and development tests.

Another object of the invention is to provide a low profile high precision actuator for generating precise motion in a confined space where there are severe restrictions in one dimension of a volume while the other two dimensions are relatively free from restrictions.

Still another object of the invention is to provide a low profile precision actuator for use in the control of the aileron surfaces of a high performance model aircraft wherein the positioning is made exact and repeatable by eliminating the joint fits which normally attach the actuating members together.

A further object of the invention is to provide a low profile precision actuator which is in the form of a rhombus having two end apexes and two side apexes. One of the end apexes is fixed while the other is attached to a movable control surface of a model aircraft. The two side apexes are threaded to receive threaded rods which can be rotated causing the side apexes to move together or apart and produce a corresponding linear movement of the moveable end apex.

These and other objects, features and advantages will become more apparent after considering the following detailed description taken in conjunction with the annexed drawings and appended claims.

DESCRIPTION OF A PREFERRED EMBODIMENT

Figure 1:
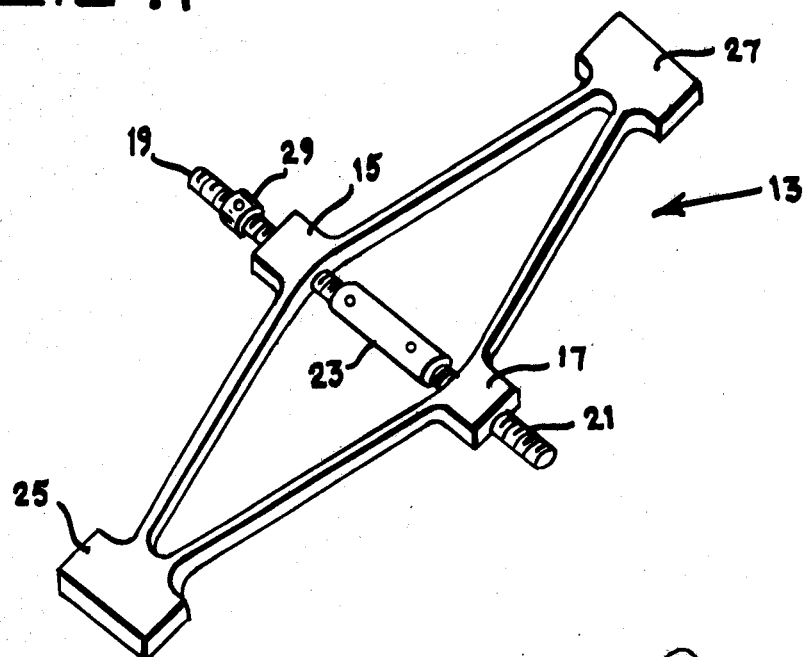
FIG. 1 is a view in perspective of one embodiment of a low profile precision actuator according to the invention showing the rhombus with the threaded side apexes and coupled shaft drive assembly.

Referring now to the drawings wherein like reference numerals refers to like elements in the several views, in FIG. 1 there is shown a view in perspective of one embodiment of the invention. A single piece metallic rhombus 13 is provided with a first side apex 15 and a second side apex 17. A right-hand threaded rod 19 passes through a right-hand threaded hole in the first side apex 15 and a left-hand threaded rod 21 passes through a left-hand threaded hole in the second side apex 17. The inner ends of the threaded rods 19 and 21 are fixedly secured to a coupling 23 which is located inside the rhombus 13. The coupling 23 locks the rods 19 and 21 to one another such that the entire assembly rotates as a drive unit when the rod 19 is rotated.

The rotation of the rod 19 which operates as a drive unit causes the distance between the apexes 17 and 15 to increase with right hand rotation (expand) and to decrease with left hand rotation (contract). As the side apexes 17 and 15 of the rhombus 13 are separated, the end apex 25 and the end apex 27 are drawin closer together. In a similar manner, as the side apexes 17 and 15 of the rhombus 13 are drawn closer together, the end apex 25 and the end apex 27 are forced apart. Thus, by expanding and contracting the rhombus 13, corresponding motion is initiated at the end apexes 25 and 27.

The expanding and contracting of the apexes 17 and 15 of the rhombus 13 is permitted by the bending of each leg in the rhombus 13. The legs are sized such that bending may take place in the plane of the apexes 17 and 15 and the ends 25 and 27, but will resist bending in all other directions. The degree of bending of the legs must be controlled such that the rhombus 13 does not collapse due to overbending. This is accomplished by sizing the coupling 23 and placing a collar 29 on the rod 19 thereby keeping the expansion and contraction of the rhombus 13 within critical limits. The bending of the legs is the only mechanism involved in the motion of the rhombus 13 and this bending does not have any joint fit tolerances.

Figure 2:
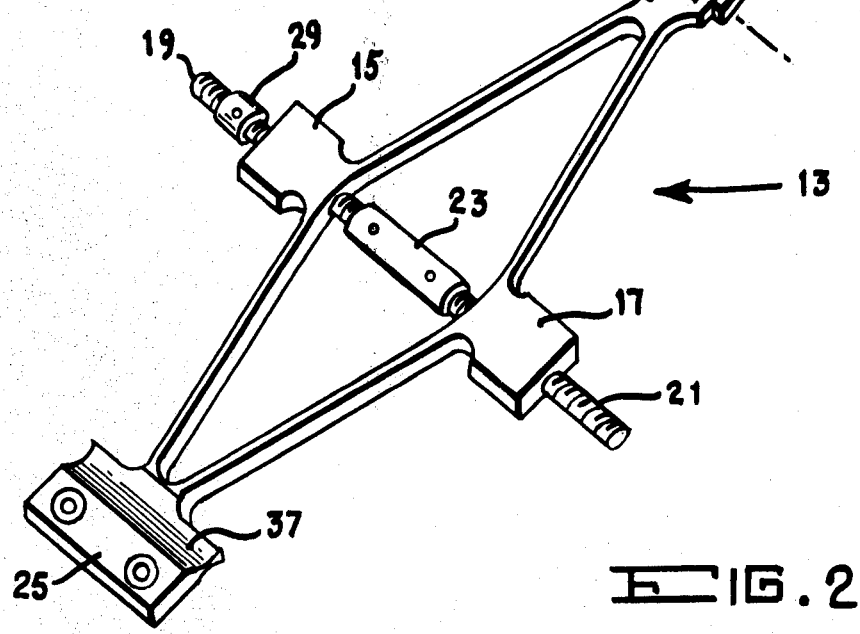
FIG. 2 is a view in perspective of another embodiment of the invention showing the rhombus and drive assembly and including a reduced section near the fixed apex to permit bending in a plane perpendicular to the legs of the rhombus.
Figure 3:
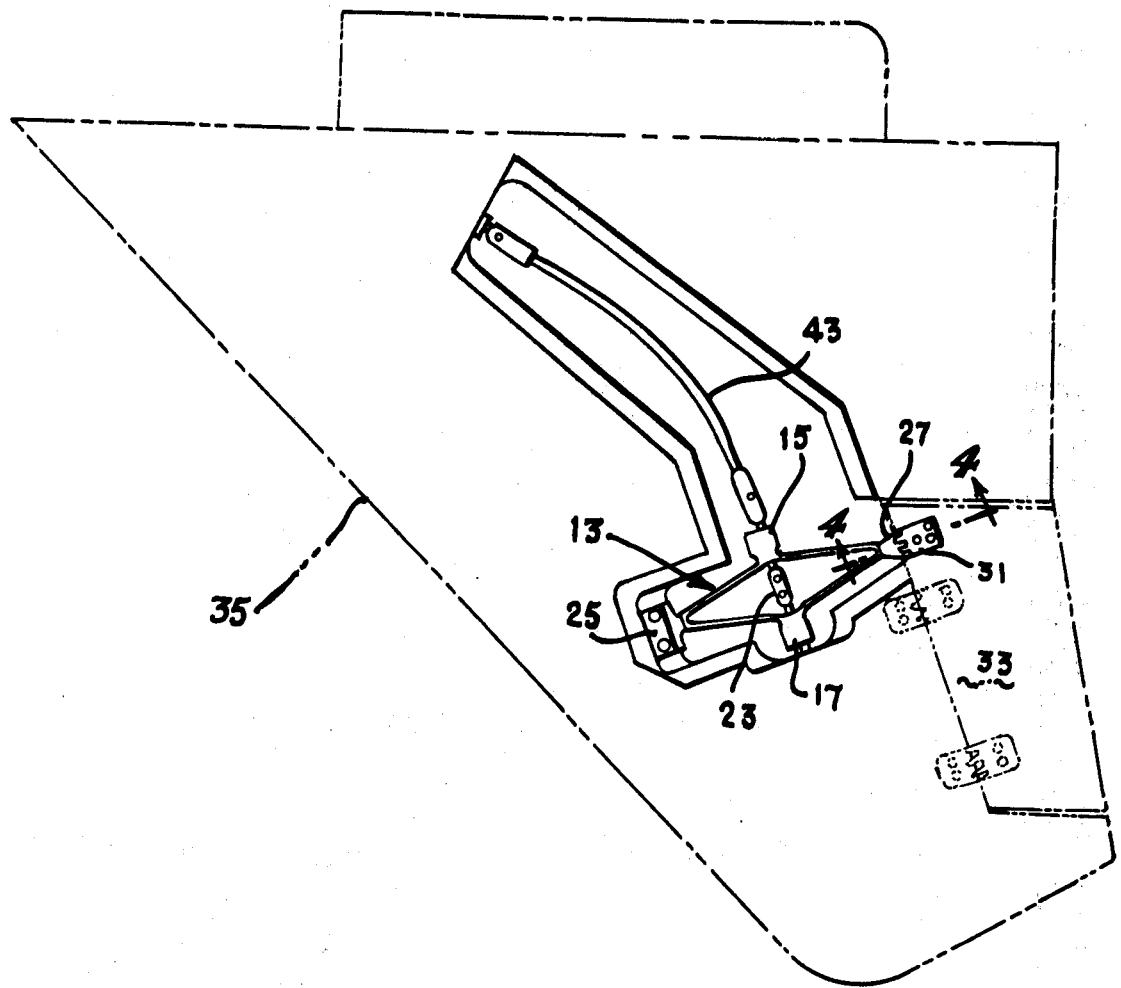
FIG. 3 is a top view of the low profile precision actuator of FIG. 2 installed in the wing of a test model aircraft for controlling the position of the ailerons during wind tunnel testing of the model.
Figure 4:
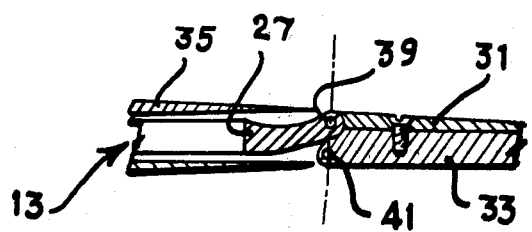
FIG. 4 is an enlarged view in cross-section taken along the line 4—4 of FIG. 3 of the precision actuator installed between the upper and lower wing surfaces showing the moveable end apex of the rhombus attached to the aileron.

In another embodiment of the invention illustrated in FIG. 2, the rhombus 13 is designed for use on a wind tunnel model shown in FIG. 3. For this application, a hinge tab 31 is added to apex 27 of the rhombus 13 for attaching to the aileron 33 of the wing 35 of the aircraft model. A flexure 37 is machined in the apex 25 of the rhombus 13 to permit the actuator to bend in a plane normal to the plane of the legs of the rhombus 13. The apex 25 is normally attached in a rigid manner to model wing 35 while the hinge tab 31 is attached to the aileron 33 with the actuator hinge line 39 offset from the aileron hinge line 41 (see FIG. 4) to provide the hinge moment necessary for aileron actuation.

With proper thread selection and rhombus design, very high forces in the direction of apexes 25 and 27 are produced for very low input drive torque in the cable 43. This mechanical ratio also provides a very precise knowledge of the position of the apex 27 with respect to apex 25 for any actuator drive assembly rotary position.

Although the invention has been illustrated in the accompanying drawings and described in the foregoing specification in terms of preferred embodiments thereof, the invention is not limited to these embodiments or to the particular configurations shown. It will be apparent to those skilled in the art that certain changes, modifications and substitutions can be made, particularly with respect to the replacement of the threaded rods with other devices that would produce motion to expand and contract the rhombus without departing from the true spirit and scope of the appended claims. Also, the end apexes could be modified by a number of means to produce a variety of motions.

Having thus set forth the nature of my invention, what I claim and desire to secure by Letters Patent of the United States is:

1. A low profile precision actuator for use in a wind tunnel test of a high performance model aircraft, said actuator comprising a one-piece metallic rhombus positioned within the wing of the model aircraft, said rhombus having two side apexes and two end apexes, one of the end apexes of said rhombus being attached to a fixed portion of the model wing, a rotatable drive assembly threadably attached to said rhombus for increasing and decreasing the distance between the side apexes of said rhombus, the other end apex of said rhombus being attached to a moveable aileron on the wing of the model to produce a movement corresponding to the rotation of said drive assembly, whereby the model aircraft can be flown through realistically simulated maneuvers to produce accurate design data for use at critical points in the maneuvering flight envelope.

2. The low profile precision actuator defined in claim 1 wherein said rotatable drive assembly includes a right-hand threaded rod passing through a right-hand threaded hole in one side apex of said rhombus, a left-hand threaded rod passing through a left-hand threaded hole in the other side apex of said rhombus, and a coupling connecting the inner ends of said right-hand and left-hand threaded rods whereby the rotation of either one of said rods produces rotation of the entire drive assembly causing the distance between the side apexes of said rhombus to vary accordingly.

3. The low profile precision actuator defined in claim 2 including a hinge tab pivotally mounted on the moveable end apex of said rhombus, said hinge tab being fixidly attached to an aileron on the model, the hinge line of said hinge tab being offset from the hinge line of the aileron thereby providing the hinge moment necessary for aileron actuation.

4. The low profile precision actuator defined in claim 3 including a flexure machined in the fixed end apex of said rhombus to permit the actuator to bend in a plane normal to the plane of said rhombus.

* * * * *